United States Patent
Kaizu

[11] Patent Number: 5,856,886
[45] Date of Patent: Jan. 5, 1999

[54] MICROSCOPE OBJECTIVE LENS

[75] Inventor: Hitoshi Kaizu, Yokohama, Japan

[73] Assignee: Nikon Corporation, Chiyoda-ku, Japan

[21] Appl. No.: 964,377

[22] Filed: Nov. 6, 1997

[30]     Foreign Application Priority Data

Nov. 12, 1996  [JP]  Japan .................................. 8-299952

[51] Int. Cl.⁶ .................................................. G02B 07/02
[52] U.S. Cl. ........................................... 359/821; 359/823
[58] Field of Search ................................... 359/821, 822, 359/823, 813

[56]               References Cited

U.S. PATENT DOCUMENTS

| | | | |
|---|---|---|---|
| 3,639,767 | 2/1972 | Sitnichenko et al. | 250/202 |
| 3,642,233 | 2/1972 | Bezerie | 244/3.16 |
| 3,784,738 | 1/1974 | Natter | 178/6.5 |
| 3,836,919 | 9/1974 | Matsumoto et al. | 95/44 |
| 5,092,670 | 3/1992 | Preston | 352/140 |

*Primary Examiner*—Georgia Epps
*Assistant Examiner*—Ricky Mack
*Attorney, Agent, or Firm*—Finnegan, Henderson, Farabow, Garret & Dunner, L. L. P.

[57]               ABSTRACT

A microscope objective lens has a modulator. The modulator can be rotated with respect to the objective lens to compensate for a change in orientation of the objective lens. This is achieved by providing various means on the objective lens for transmitting torque to the modulator, thereby rotating it.

3 Claims, 3 Drawing Sheets

MICROSCOPE OBJECTIVE LENS

BACKGROUND OF THE INVENTION

1. Field of the Invention

The present invention relates to a microscope objective lens, and, more particularly, to a microscope objective lens with a modulation contrast apparatus housing a modulator.

2. Description of the Related Art

Conventionally, microscope objective lenses used as modulation contrast devices have a modulator located within the objective lens, fixed at the pupil position of the objective lens, and cannot be rotated. A modulator is an optical member, as shown for example in FIG. 3. A first partial area 41 at one edge of the circular pupil area 40 of the objective lens has a permeability rate of 1%. A second partial area 42 extending from the first partial area 41 on the optical axis side of the objective lens has a permeability rate of 10%. The remaining area 43 has a permeability rate of 100%. The subject sample contrast is improved by using this member in the pupil position of objective lens.

Objective lenses using modulation contrast devices have the kinds of problems discussed below.

(1) Since the directions of shadowing for dark-light contrast on a three-dimensional object are unilateral, observations are made from a direction that is inappropriate depending on the direction of the sample or the item observed, so the performance of the objective lens is hindered.

(2) A sample area is first located under lower magnification, and the lens turret is then shifted so that a higher magnification objective lens may be utilized for a closer examination of the sample area. However, the orientations of the modulators of the two lenses differ, making observations difficult.

SUMMARY OF THE INVENTION

The object of the invention is to provide a microscope objective lens which allows for correction of modulator orientation.

Additional objects and advantages of the invention will be set forth in part in the description which follows, and in part will be obvious from the description, or may be learned by practice of the invention. The objects and advantages of the invention will be realized and attained by the elements and combinations particularly pointed out in the appended claims.

To obtain the object and advantages, and in accordance with the purpose of this invention, as embodied and broadly described herein, the objective lens comprises a modulator located at the pupil position of the objective lens. An external portion of the objective lens includes a manual rotation mechanism for transmitting torque to the modulator. By rotating the rotation mechanism, the orientation of the modulator can be adjusted.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
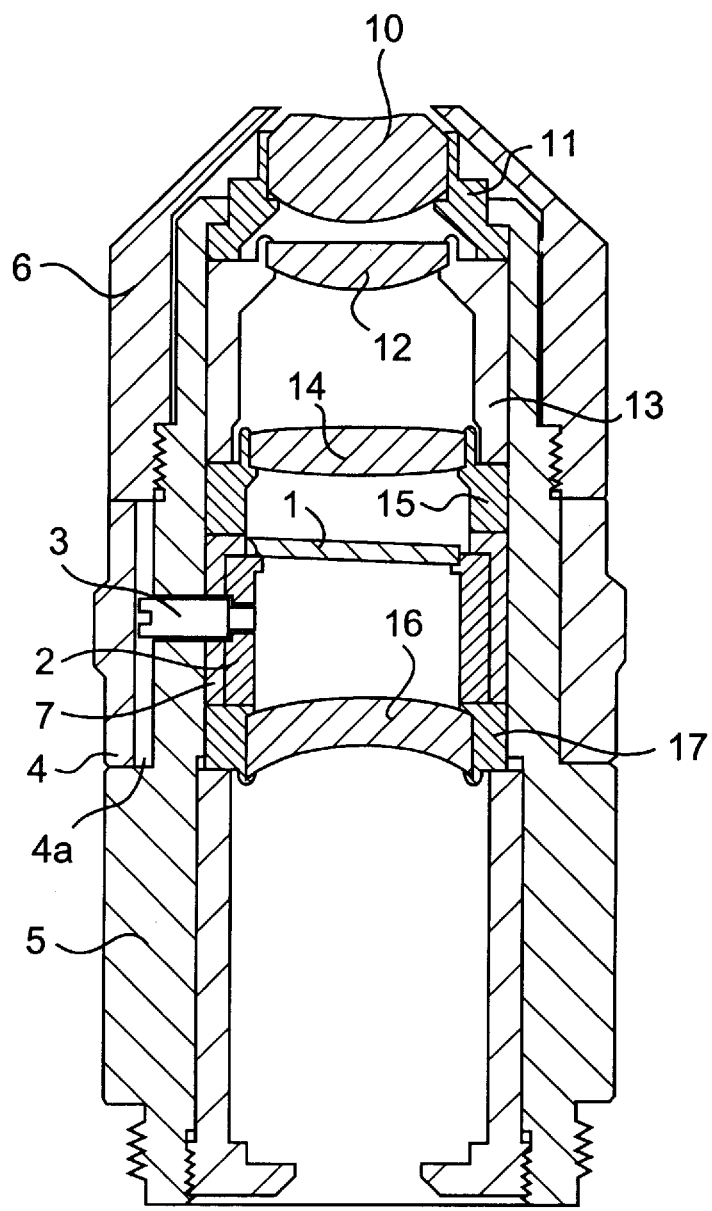
FIG. 1 is a section view of the first embodiment of the microscope objective lens of the present invention.

A first embodiment of the microscope objective lens of the present invention is shown in FIG. 1. A first lens element 10 positioned in one end of the objective lens is retained by retaining member 11. The retaining member 11 is mated and confined inside a tubular case 5. Likewise second, third, and fourth lens elements 12, 14, 16 are retained at the respective ends of retaining members 13, 15, 17. Each of these retaining members 13, 15, 17 is mated inside the case 5. A modulator 1 is positioned between the third lens element 14 and the fourth lens element 16. The modulator 1 is retained by a retaining member 2, which, in turn, is mated to the case 5 via an annular member 7. The modulator 1 is located in the pupil position of the objective lens.

On the exterior of the case 5, a cover member 6, provided with a rotating ring 4 in the central part, is located on the end of the objective lens. The cover member 6 is fixed to the case 5 and the rotating ring 4 is mounted so that it rotates around the case 5 and the cover member 6.

A pin 3 is provided in the retaining member 2 for modulator 1, and its end is fitted into a groove 4a provided in the rotating ring 4. Annular member 7 and case 5 are provided with circumferential openings so that pin 3 can move around the circumference. The rotation of the rotating ring 4 causes the retaining member 2 and the modulator 1 to rotate in the case 5.

In the first embodiment, only the modulator 1 is rotated. However, the present invention is not limited to this embodiment. For example, it is possible for the retaining members 2, 15 and the annular member 7 to be secured into a single unit. By rotating the rotational ring 4, the modulator 1 and the third lens element 14 can also be rotated. It is also possible to join retaining members 2, 11, 13, 15, 17 and the annular ring 7. Rotation of the rotating ring 4 would then cause all of the first through fourth lens elements 10, 12, 14, 16 to rotate along with the modulator 1.

Also, the rotating mechanism that rotates the modulator is not limited to that of the first embodiment. In another suitable mechanism, for example, a portion of the exterior of the retaining member 2 that retains the modulator 1, acts as a gear. Rotation occurs by way of a small gear attached to the outer frame.

Figure 2:
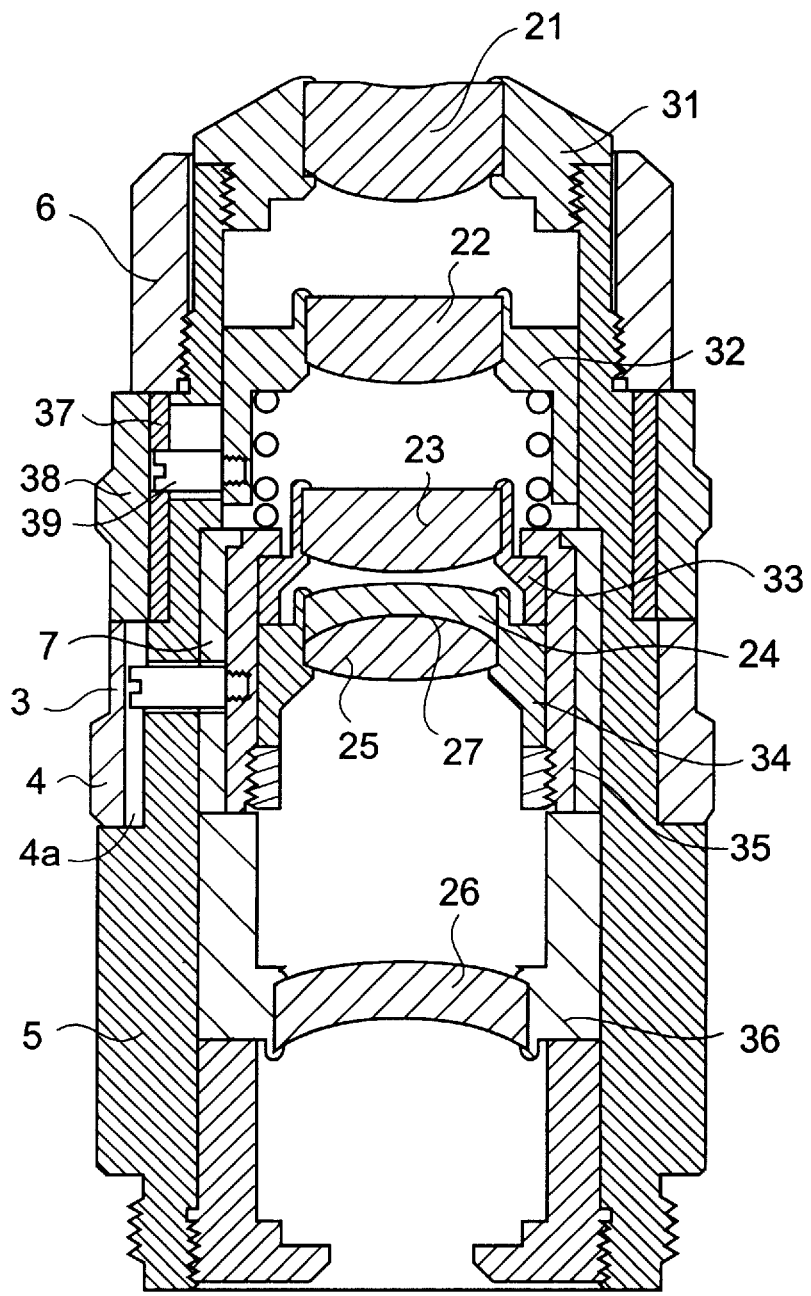
FIG. 2 is a section view of second embodiment of the microscope objective lens of the present invention.
Figure 3:
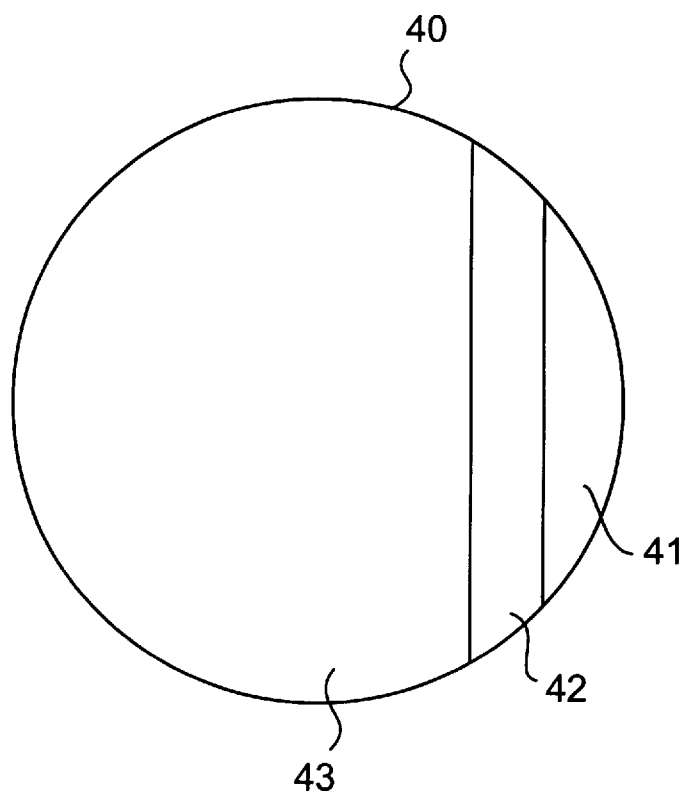
FIG. 3 is a planar view of a modulator.

FIG. 2 shows a second embodiment of the microscope objective lens of the present invention. Components that serve the same function as in FIG. 1 bear the same reference numbers as in FIG. 1.

The first objective lens 21 is retained by a retaining member 31 fixed to the main housing 5. A pin 39 is provided in the retaining member 32 of the second lens element 22. The tip of this pin 39 is inserted in a cam groove 37 located on the rotating ring 38. When the rotating ring 38 rotates, the second lens element 22 and the retaining member 32, engaged in the main housing 5, move axially in the optical direction. This mechanism is meant to compensate for aberrations in focal position caused by the thickness of the cover glass that is found between the sample and the objective lens.

Starting from the tip, the third lens element 23, as well as fourth and fifth lens elements 24, 25, are retained by retaining members 33, 34, respectively. Since the pupil position of the objective lens is between lens elements 24 and 25, the modulator 27 is in the interface of the fourth and fifth lens elements. The retaining members 33, 34 that contain the modulator 27 are themselves retained by retaining member 35 and are engaged in the main housing 5 by a ring member 7.

A pin 3 is provided in the retaining member 35 that retains the modulator 27, and its tip is inserted into a groove 4*a* in the rotating ring 4. Rotation of the rotating ring causes the lens element group 23, 24, 25 that includes the modulator, as well as their retaining members 33, 34, 35, to rotate in the main housing 5. Since, as noted above, the modulator is located in the pupil position, the modulator does not have to be made on a level plate, but may also be made on a lens element surface or the interface of two lens elements.

The fifth lens element 26 is retained by a retaining member 36 engaged in the main housing 5. The embodiment described above involves structure where the part of the lens system that includes the modulator is rotated. An entire lens system of an objective lens rotating as one unit is also possible. If reciprocal eccentric precision is required between lens elements, a structure whereby a part of (or the whole) lens system containing the modulator is rotated is preferable to rotating only the modulator.

As described above, a modulator is positioned in a rotatable fashion in an objective lens and, and irrespective of the direction or the sample or the observed item, the function of the objective lens can be amply demonstrated. Also, even if the objective lens is changed from low to high magnification, the modulator direction can be adjusted and observations can be made easily.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An objective lens comprising:

a lens element retaining tube retaining multiple lens elements of the objective lens;

a modulator located at a pupil position of the objective lens;

a retaining member retaining the modulator and being rotatable in the lens element retaining tube;

a rotating ring around an outer surface of the lens element retaining tube, the rotating ring being rotatable with respect to the lens element retaining tube; and a transfer mechanism for transferring torque from the rotating ring to the retaining member, whereby rotation of the rotating ring causes the modulator to rotate at the pupil position.

2. An objective lens as in claim 1, the retaining member retains at least one of the multiple lens elements.

3. An objective lens as in claim 2, the modulator is located in at least one of the multiple lens elements.

* * * * *